May 29, 1962 M. A. ALEXANDER 3,037,166

QUANTIZING CIRCUITS

Filed March 23, 1959 4 Sheets-Sheet 1

INVENTOR
MATTHEW A. ALEXANDER

BY

ATTORNEY

FLIP-FLOP STATES AFTER EIGHT OR MORE FINE PULSES ARE RECEIVED

| | F1 | F2 | F3 | F4 | F5 | F6 | F7 | F8 | $O_4$ | $O_2$ | $O_1$ | $O_4'$ | $O_2'$ | $O_1'$ |
|---|---|---|---|---|---|---|---|---|---|---|---|---|---|---|
| SET | 1 | 1 | 1 | 1 | 1 | 1 | 1 | 1 | | | | | | |
| 1 | 0 | 0 | 0 | 0 | 0 | 0 | 0 | 1 | 0 | 0 | 0 | 0 | 0 | 0 |
| 2 | 1 | 0 | 0 | 0 | 0 | 0 | 0 | 0 | 0 | 0 | 1 | 1 | 1 | 1 |
| 3 | 0 | 1 | 0 | 0 | 0 | 0 | 0 | 0 | 0 | 1 | 0 | 1 | 1 | 0 |
| 4 | 0 | 0 | 1 | 0 | 0 | 0 | 0 | 0 | 0 | 1 | 1 | 1 | 0 | 1 |
| 5 | 0 | 0 | 0 | 1 | 0 | 0 | 0 | 0 | 1 | 0 | 0 | 1 | 0 | 0 |
| 6 | 0 | 0 | 0 | 0 | 1 | 0 | 0 | 0 | 1 | 0 | 1 | 0 | 1 | 1 |
| 7 | 0 | 0 | 0 | 0 | 0 | 1 | 0 | 0 | 1 | 1 | 0 | 0 | 1 | 0 |
| 8 | 0 | 0 | 0 | 0 | 0 | 0 | 1 | 0 | 1 | 1 | 1 | 0 | 0 | 1 |

NUMBER OF FLIP-FLOP FIRST SET TO ZERO

| DIRECT CODE LOGIC | EIGHT'S COMPLEMENT |
|---|---|
| $O_4 = F4 + F5 + F6 + F7 + F$ | $O_4' = F1 + F2 + F3 + F4$ |
| $O_2 = F2 + F3 + F6 + F7$ | $O_2' = F1 + F2 + F5 + F6$ |
| $O_1 = F1 + F3 + F5 + F7$ | $O_1' = O_1$ |

INVENTOR
MATTHEW A. ALEXANDER
BY
ATTORNEY

| t | I (F1 F2 F3 F4) | II | III | IV |
|---|---|---|---|---|
| | 0 0 0 0 | | | |
| | 1 0 0 0 | 0 0 0 0 | | |
| | 1 1 0 0 | 0 1 0 0 | 0 0 0 0 | |
| | 1 1 1 0 | 0 1 1 0 | 0 0 1 0 | 0 0 0 0 |
| | 1 1 1 1 | 0 1 1 1 | 0 0 1 1 | 0 0 0 1 |
| | 0 1 1 1 | 1 1 1 1 | 1 0 1 1 | 1 0 0 1 |
| | 0 0 1 1 | 1 0 1 1 | 1 1 1 1 | 1 1 0 1 |
| | 0 0 0 1 | 1 0 0 1 | 1 1 0 1 | 1 1 1 1 |
| | 0 0 0 0 | 1 0 0 0 | 1 1 0 0 | 1 1 1 0 |

COARSE PULSE #1

COARSE PULSE #2

COARSE PULSE #3

| | F1 | F2 | F3 | F4 | $O_2$ | $O_1$ | $O_2'$ | $O_1'$ |
|---|---|---|---|---|---|---|---|---|
| I | 0 | 0 | 0 | 0 | 0 | 0 | 0 | 0 |
| II | 1 | 0 | 0 | 0 | 0 | 1 | 1 | 1 |
| III | 1 | 1 | 0 | 0 | 1 | 0 | 1 | 0 |
| IV | 1 | 1 | 1 | 0 | 1 | 1 | 0 | 1 |

$O_2 = F1 . F2$
$O_1 = F1 . (F2' + F4')$ DIRECT CODE $O_2' = F1 . F3'$
$O_1' = O_1$ COMPLEMENT

INVENTOR
MATTHEW A. ALEXANDER
BY [signature]
ATTORNEY

INVENTOR
MATTHEW A. ALEXANDER
BY
Lester S. Hecht
ATTORNEY

United States Patent Office 3,037,166 Patented May 29, 1962

3,037,166

QUANTIZING CIRCUITS

Matthew A. Alexander, Santa Monica, Calif., assignor to Computer Equipment Corp., Los Angeles, Calif.

Filed Mar. 23, 1959, Ser. No. 801,035
7 Claims. (Cl. 324—68)

This invention relates to quantizing circuits and, more particularly, to a time-interval quantizer having a resolution capability in the order of millimicroseconds. In further particular, the invention is concerned with an improved method for quantizing to permit a very high degree of resolution without requiring complicated electronic vernier circuits such as are described in Patent No. 2,738,461 entitled "Method and Apparatus for Measuring Time Intervals" by D. W. Burbeck, found in Patent Office Class 324–68.

High-resolution time quantizing has heretofore been difficult to achieve since the electronic circuits employed are limited in terms of maximum speed of response. This means that it is not possible, as an example, to quantize a time interval to obtain a direct resolution of twenty millimicroseconds by counting pulses generated at a fifty megacycle rate. The counter response is limited by the time required to cascade carry signals to obtain the desired count representation—e.g.: a binary count; and is also limited by the maximum trigger response time of the bistable elements or flip-flops employed. The maximum reliable counting rate employing conventional counters is in the order of five to ten megacycles.

Many attempts have been made, therefore, to obtain the desired degree of resolution by supplementing the conventional counter function by additional means such as the vernier circuits mentioned above. According to the vernier technique of the Burbeck patent, mentioned above, two separate series of pulses are generated having pulse periods of N and $N-1$ units, respectively. The pulses having the N-unit period may be referred to as coarse pulses and are counted during the time interval to be measured. The pulses having the $N-1$ unit period may be referred to as the fine or vernier pulses and are not generated until the end of the time interval to be measured. The coarse pulses are no longer counted at this time but are still generated. A high degree of resolution is obtained by detecting the number of vernier pulses which are generated before there is coincidence in time between a coarse pulse and a vernier pulse.

This scheme has several disadvantages. Firstly, it is necessary to produce two different series of pulses at very accurately regulated frequencies. Secondly, a considerable time interval may elapse before a precise vernier count is known. For high resolution, this may be in the order of ten coarse pulse intervals. Thirdly, a complicated coincidence technique must be employed since coincidence in time of two pulses must be detected with a high degree of precision.

Another scheme for solving the problem of high-resolution time quantizing is found in Patent No. 2,740,091 by S. S. Goulding for "Means for Measuring Time Intervals" found in Patent Office Class 324–68.

In the Goulding system an "A" pulse is generated in synchronism with a start pulse marking the beginning of a time interval to be measured. The "A" pulse is recirculated through a delay line having a length of $\phi+d\phi$ units. "B" pulses are then generated starting with a stop pulse marking the end of the time interval to be measured, the "B" pulse circulation delay being only $\phi$ units. The "A" pulse width is made to correspond to the interval $d\phi$ so that the "A" pulses may be utilized to detect the occurrence of a "B" pulse within the $d\phi$ interval and thus permit higher resolution in quantizing. As an example of operation, the Goulding system is described with respect to a "B" pulse interval of 20 microseconds and an interval $d\phi$ of .2 microsecond. If the stop pulse occurs .7 microsecond following one of the recirculated "A" pulses the fine quantizing period to be added to the count of "A" pulses is found to be between .6 and .8 microsecond since three cycles of the "A" pulse occur before a "B" pulse is detected within the $d\phi$ pulse width of the "A" pulse.

The Goulding technique has the same disadvantage as the Burbeck technique in requiring a considerable amount of time following the termination of the interval to be measured before the precise resolution has been determined. It also requires a very sharp coincidence between two pulses of rather narrow width although the "A" pulse can be broader than the "B" pulse.

The present invention avoids the disadvantages inherent in the vernier and the pulse circulation techniques discussed above and makes it possible to quantize time intervals or voltage levels known to be varying at a prescribed rate in time with a higher degree of resolution than heretofore possible and, of equal importance, with such a small delay in time in determining the final high-resolution answer that continuous high-resolution measurement may be made. This means, for example, that time intervals in the order of millimicroseconds may be measured continuously between successfully occurring pulses, no time being wasted in determining each answer representing the interval between a present pulse and a previously occurring pulse except that required to transfer the answer from the quantizing system to a place for utilization.

According to the basic concept of the present invention a single oscillator is employed to generate coarse pulses designating the major time intervals to be counted by a conventional counter. These coarse pulses are translated by means of a frequency multiplier, which may constitute a tapped delay line, into fine pulses having a period therebetween corresponding to the desired resolution. That is, if the time interval between coarse pulses is in the order of .16 microsecond and if the desired resolution is 20 millimicroseconds, then the coarse pulse interval is divided by 8 by means of a frequency multiplier or equivalent circuit.

Each fine pulse derived from the frequency multiplying means is then applied to a separate coincidence gate which also receives certain other signals. The coincidence gate does not operate as the prior art circuits described above since only a single pulse is applied thereto, the other signals being maintained at predetermined control levels throughout a relatively long interval. Thus the problem of pulse coincidence inherent in the prior art devices is obviated.

The output circuit of each coincidence gate is coupled to a respective storage element such as a flip-flop. According to the basic technique of the invention the logical gating actuating the flip-flops is arranged such that the terminating states of all flip-flops considered together represent the precise time of occurrence of a marking signal which may occur at either the beginning or end of a time interval.

The invention may also be used to provide an absolute time measurement of very high accuracy as well as for measuring the interval between two pulses. That is, the time of occurrence of a single pulse can be specified as an absolute time with an accuracy in the order of 20 millimicroseconds. The coarse pulses in this case correspond to absolute time intervals.

The direct fine pulse translating technique of the invention makes it possible to continuously translate successive pulse intervals into sets of output signals representing respective intervals. This may be accomplished in either of two basic operating modes. In one mode of operation each fine pulse translation provides both a beginning and ending code for the interval to be measured. The beginning code corresponds to the complement of the ending code of the previously interval, that is if the interval is measured in terms of X fine pulses for each coarse pulse period and the previous ending measurement is N fine pulses, then the complement for the beginning fine measurement for the next measurement is $X—N$ fine pulses. These fine pulse measurements are read from the flip-flops which receive the gated fine pulses, in a manner more fully described in the detail description below. The complete interval measurement for each pair of pulses in the continuous measuring operation of the invention is computed by adding the coarse count to the beginning and ending fine pulse measurements.

According to the other mode of continuous pulse interval measurement contemplated by the invention, each pulse occurrence may be represented as an absolute time by combining the coarse count of the interval with the ending fine measurement. Then the pulse periods can be measured by subtracting the last measured absolute pulse time from the next measured pulse time, the difference constituting the precisely quantized pulse separation between one pair of pulses. This is then continued by subtracting each previous absolute measurement from the next.

Accordingly, it is an object of the present invention to provide an improved quantizing circuit having very high resolution.

Another object is to provide a device for representing the precise time of occurrence of an input signal without the necessity of utilizing the complicated vernier or pulse delay technique known in the art.

Another object is to provide a technique for continuously translating a series of input pulses into corresponding sets of output signals representing the precise time interval between successive pairs of pulses.

Still another object is to provide a time interval measuring device having a minimum of delay in operation in determining the precise time of occurrence of the signal or the precise interval between two signals.

The novel features which are believed to be characteristic of the invention, both as to its organization and method of operation, together with further objects and advantages thereof will be better understood from the following description considered in connection with the accompanying drawings. It is to be expressly understood, however, that the drawings are for the purposes of illustration and description only and are not intended as a definition of the limits of the invention:

Figure 1:
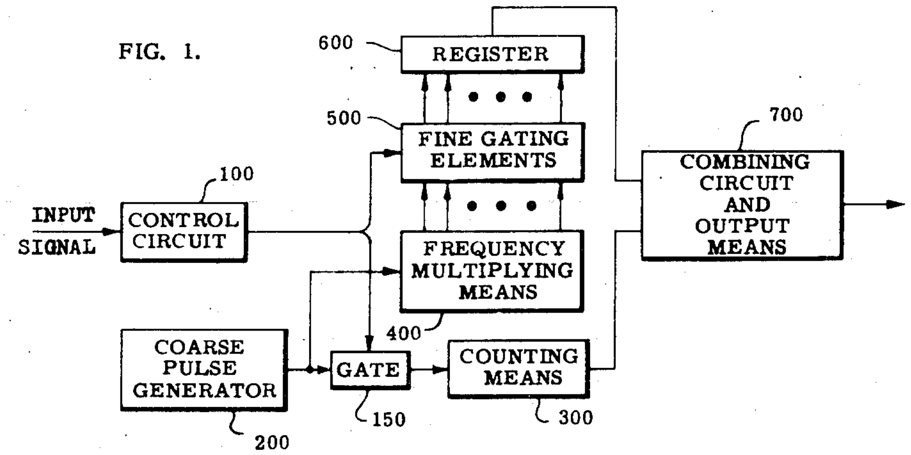
FIG. 1 is a block diagram illustrating a suitable arrangement for practicing the invention.

Referring now to FIG. 1 it is noted that an input signal which may constitute a pulse or a series of pulses is applied to a control circuit 100. Control circuit 100 produces appropriate signals for actuating a gate 150 which receives coarse pulses from a generator 200 and routes them to counting means 300. The pulses produced by generator 200 are also applied to a frequency multiplying means 400 which provides a plurality of output signals on respective leads occurring during each coarse pulse interval as is more fully discussed below.

The signals produced by means 400 are applied to a corresponding series of fine gating elements 500 which also receive control signals from circuit 100 and are operative to pass signals to a register 600 according to predetermined input logic. Register 600 has its output signals applied to combining circuit 700 which receives the output of counting means 300 and produces a set of output signals representing either the absolute time interval of occurrence of an input signal or a time difference interval between two pulses or input signals.

In this embodiment of the invention, which is adapted to measure time intervals between successive input signals, a count of the coarse time pulses between each pair of input signals is generated in counting means 300. This may be accomplished, for example, by reading out the counter total and re-setting to zero on receipt of each input signal to control circuit 100, or by reading out the counter total and subtracting therefrom the previous total read out on a succeeding input signal.

Fine gating elements 500 receive continuous input pulses from frequency multiplying means 400, but register 600 is operable only for a short time interval following each input pulse to control circuit 100. In each operating interval register 600 produces a code indicating the time of occurrence, in fine time intervals, of the corresponding input signal to control circuit 100. The operating cycle of register 600 can be defined, for example, by a control signal which begins with each input signal and extends for the desired operating time of the register 600, the control signal being utilized to open gates 500 to pass the fine time pulses to register 600, whereby register 600 receives input signals only during the time interval when the control signal is high.

The starting and ending codes for a pair of input pulses to control circuit 100 are combined with the coarse time count therebetween in combining circuit 700, which is coupled to register 600 and counting means 300, to produce an output signal representing the time interval between the two pulses to the nearest fine time interval. This process will be better understood with reference to a specific example. Suppose that the time interval between coarse pulses is 0.16 microsecond and the multiplication factor of frequency multiplying means 400 is 8, such that the time interval between each fine pulse is 20 millimicroseconds. Suppose further that a first input pulse to control circuit 100 occurs shortly before the third fine pulse between a pair of coarse pulses, and that a second input pulse occurs 3.30 microseconds later, which is equivalent to 20 coarse time intervals +5 fine time intervals.

In this example, counting means 300 would count a total of 19 coarse time intervals before arrival of the second input pulse, which would occur 7 fine time intervals following the 19th coarse pulse. The starting code generated in register 600 would indicate that the first pulse occurred on a third fine time pulse, and that the second pulse occurred on an eighth fine time pulse, which correspond respectively to 2 fine time intervals and 7 fine time intervals. In combining circuit 700 the total elapsed time is derived from these signals by adding the coarse count to the second fine time code and the eight's complement of the first fine time code, which is derived by subtracting the first code from eight. The total measured time is therefore 19 coarse intervals +7 fine intervals +(8—2) fine intervals, which equals 20 coarse intervals and 5 fine intervals, or 3.30 microseconds.

This process can be repeated continuously to measure intervals between a series of pulses, with the ending code of one interval being the beginning code for the following interval. In continuous interval measurement applications, two codes would be generated for each input signal; an ending code, consisting of the number of fine pulse intervals between the input and the previous coarse pulse, and a beginning code, consisting of the number of fine pulse intervals between the input and the following coarse pulse. Each beginning code will be stored for one interval, and the ending code generated by each input pulse will be added to the stored beginning code of the previous input pulse to give the total fine time count for the interval, which is added to the coarse count to give the total time elapsed between each input pulse and the previous input pulse.

The concept of fine pulse gating according to the invention can be better understood by reference to an illustrative embodiment. Accordingly the following discussion will relate to FIG. 2 which illustrates one suitable arrangement of means 500 and 600 of the embodiment of FIG. 1.

As indicated therein means 400 may constitute a delay line with appropriate taps thereon such that each applied coarse pulse is translated into eight successive fine pulses, the first of which may coincide in time with a coarse pulse. This time sequence of pulses is indicated in FIG. 2B where the fine pulses are numbered 1 through 8, pulse number 1 occurring in coincidence with a coarse pulse, and pulse number 8 occurring one fine time increment prior to the following coarse pulse.

Figure 2:
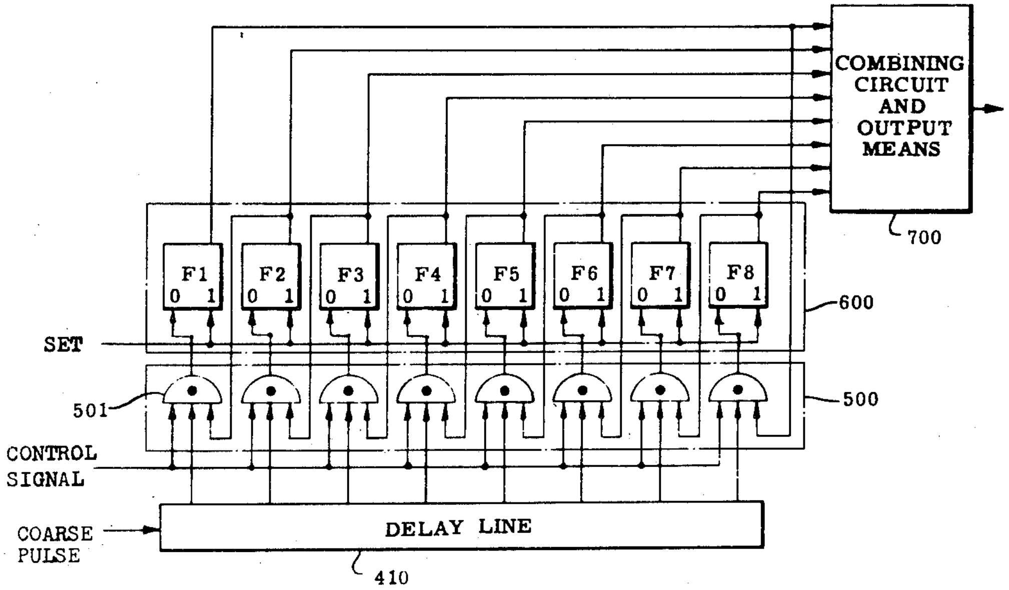
FIG. 2 is a partial schematic diagram illustrating one suitable form for means 500 and 600 of the embodiment of FIG. 1.
Figures 2A, 2B:
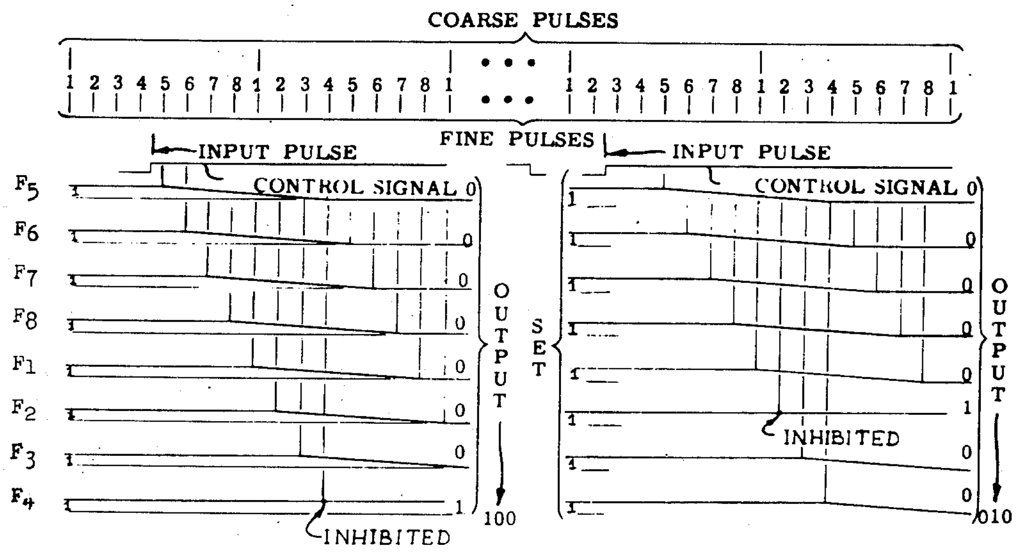
FIG. 2A is a chart and set of logical algebra defining the mechanization of the embodiment of FIG. 2.
FIG. 2B is a composite set of wave forms illustrating the operation of the embodiment of FIG. 2.

Referring now to both FIGS. 2 and 2B it will be noted that the control signal is applied to each of a plurality of coincidence circuits in means 500, circuit 501 being considered to be typical. Each coincidence circuit in means 500 receive fine time pulses from a corresponding section of delay line 410, the fine time pulses being passed through to a corresponding element in register 600 when the control signal is high, or "on," and being blocked when the control signal is low, or "off." As described above, the control signal is turned "on" by each input signal to control circuit 100, and stays "on" for at least one coarse time interval. Since the delay line 410 receives continuous coarse pulse inputs, the position of the coincidence circuit first passing a fine pulse indicates the time of occurrence of an input signal to control circuit 100. For example, if an input signal is applied to control circuit 100 two fine time intervals after a coarse time pulse, then all of the coincidence circuits in means 500 will be opened at that time, but the first fine pulse will be received by the third coincidence circuit from the left in FIG. 2. The position of the first coincidence circuit receiving a fine pulse is utilized to generate a code representing the time of the input signal by means more fully described below.

The fine time pulses passed through each coincidence circuit of means 500 are applied to the "off," or binary 0, input terminal of an associated flip-flop in register 600. Each flip-flop in register 600 is initially set to the "on," or binary 1, state by a set signal applied when the circuits are initially energized, and applied periodically following each input signal to control circuit 100. The set signal is preferably generated by the trailing edge of the control signal, such that register 600 is reset immediately after each operating cycle thereof. The fine time pulses passed through the coincidence circuits act to turn the flip-flops off in sequence, with the sequence being terminated after 7 changes of state by a "latch back" circuit, described below, which leaves the register in a state indicative of the first coincidence circuit receiving a fine pulse, thereby specifying the time, in fine time intervals, of the occurrence of the corresponding input signal to control circuit 100. Thus register 600, comprising flip-flops F1 through F8, is run through a cycle of seven changes of state following each input signal to control circuit 100 with the final state of the register signifying the time, in fine time intervals, at which the corresponding input signal occurred. Following each cycle the register 600 is reset by a set signal in preparation for the next input signal to control circuit 100.

In addition each of the coincidence circuits in means 500 also receives an inhibiting output signal from the next higher stage flip-flop in register 600, which prevents each coincidence circuit from passing fine time pulses when the flip-flop associated with the next coincidence circuit is in the "off" state. Thus flip-flop F2 when "on" permits a pulse to be passed through gating circuit 501 if at the same time the control signal is at a high or "on" level. In a similar manner the gating circuit controlling flip-flop F5 receives the "on" representing output signal of flip-flop F6 and passes a pulse derived from a tap delay line 410 at fine pulse time 5. This fine pulse is therefore applied to the zero-setting input circuit of flip-flop F5 if the control signal is "on" at that time and if flip-flop F6 has not already been turned "off."

The inhibiting output signals limit the cycle of register 600 to seven changes of state regardless of the length of the control signal, since the pulses passed through the coincidence circuits turn the associated flip-flop "off," which applies an inhibiting signal to the previous coincidence circuit, and blocks subsequent pulses from passing therethrough even if the control signal remains "on." Therefore the cycle of register 600 is limited to seven changes of state, with the flip-flop prior to the first coincidence circuit receiving a fine pulse remaining "on" and all other flip-flops being turned off. This action can be more clearly described with reference to FIGS. 2A and 2B.

FIG. 2A shows all of the possible terminal states of register 600, with the number column on the left indicating the first flip-flop set to binary zero following an input signal, and each row indicating the terminal state of the flip-flops for the corresponding input signal time. The logical equations show how the 8 register states of the chart can be translated into binary codes representing the time of the input signal in fine time intervals following one coarse pulse (direct logic) and fine time intervals prior to the next coarse pulse (eight's complement). The 0 and 0′ code columns, on the right of the register terminal state chart, indicate the values of the direct and complementary codes for the corresponding terminal states of the register.

Referring now to FIG. 2A the states of flip-flops F1 to F8 are indicated as they appear after eight or more fine pulses have been received during an interval when the control signal is at a high level. It is assumed in this example that all flip-flops F1 through F8 are initially set to a binary 1 or "on" state. If flip-flop F1 is first set to zero by fine pulse number 1 then flip-flop F8 will be the only flip-flop in the "on" state after eight or more fine pulses have been received since it is the only flip-flop which is prevented from being turned "off" due to the absence of the enabling control of flip-flop F1. This effect may be referred to as a "latch-back" control in the sense that each flip flop stage latches back after being actuated by a fine pulse and prevents the previous flip-flop stage from changing state. It will be understood of course, that a similar operation may be accomplished by initially setting the flip-flops to their zero-representing state and by then turning each flip-flop "on" in response to the coincidence of occurrence of the control signal and a respective fine pulse.

FIG. 2B shows the wave forms of the control signal and flip-flops for a pair of input signals the first of which occurs between a 4th and 5th fine pulse, and the second of which occurs between a 2nd and 3rd fine pulse. The terminal state of the flip-flops for each input signal is indicated by the column on the right of each chart, with the binary code corresponding thereto indicated as the output. The register cycle for each input signal begins with the input pulse, which determines the leading edge of the control signal, and ends on the eighth fine pulse thereafter, since the coincidence circuit receiving the eighth fine pulse is inhibited by the "latch back" signal generated in response to the first line pulse following the input signal.

In referring to FIG. 2B where the output wave forms of flip-flops F1 through F8 are shown it will be noted that the flip-flop response time may bew commensurate with a coarse pulse interval since it is only necessary that the output signal produced by the flip-flop assume the desired gating level before the next fine pulse is routed to the previous flip-flop stage. Thus the "on"-representing output signal of flip-flop F5 may fall slowly as long as it falls below the gating level before the next fine pulse number 4 occurs.

Eight fine pulses after the occurrence of the first impulse in FIG. 2B leaves the flip-flops in the states indicated in FIG. 2A, row five; that is: 00010000. This condition may be translated into complementary binary output signals 100 ($O_4'$, $O_2'$, $O_1'$) according to the logic of FIG. 2A. It is assumed in the example of FIG. 2B that the interval between two input pulses is to be measured. Consequently flip-flops F1 through F8 are reset to binary one-representing states and then are set to zero by respective fine pulses following the occurrence of the second input pulse. This is shown to occur before the occurrence of fine pulse number 3 so that flip-flop F3 is first turned "off." After eight fine pulses flip-flop F2 remains "on" since the enabling signal from flip-flop F3 is not present for its associated gating circuit. The flip-states at this time may be translated into the direct binary output signals 010. The total fine measurement to be added to the coarse count is then six, or binary 110. Thus, by employing the logic shown in the equations of FIG. 2A, the total fine time interval separating adjacent pairs of pulses in an input pulse train can be continuously computed by the simple process of adding the direct code of each signal to the complementary code of the previous signal, the sum of the two codes giving a direct indication, in binary numbers, of the total fine time interval separating the two input pulses. The total time interval between the two input pulses is then derived by adding the coarse time count of counting means 300 to the total fine interval derived from the above noted logical addition.

Figures 3, 3A:
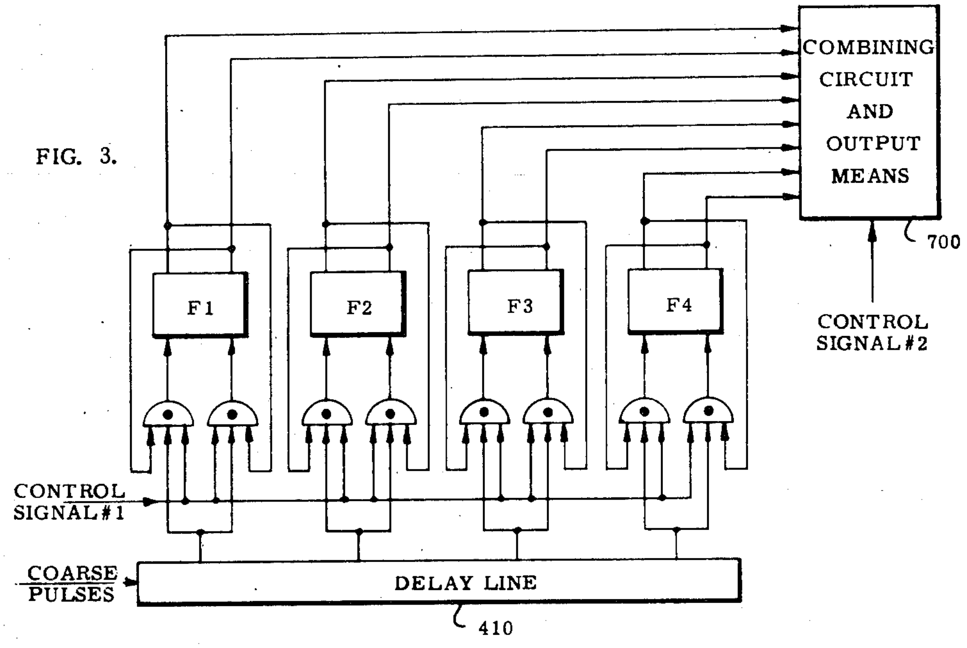
FIG. 3 is a partial schematic diagram of another arrangement of means 500 and 600 of the embodiment of FIG. 1.
FIG. 3A is a chart and set of logical algebra for the embodiment of FIG. 3.

Another variation illustrating the use of the basic quantizing principle of the invention whereby a coarse pulse interval may be translated into a series of fine pulse intervals of high resolution is illustrated in partial schematic diagram in FIG. 3. The operation of this embodiment will be described with reference being made also to FIG. 3A where four possible sequences of operation are shown, the instantaneous state of the flip-flops being shown for successive fine time input pulses, represented by rows from top to bottom. As will be seen in the chart of FIG. 3A, this embodiment employs a fine pulse multiplication factor of 4, rather than 8. The operating cycle of the register of this embodiment, however, covers 8 fine time pulses, with the terminal states of the register being illustrated by the bottom row of the chart, i.e. the row immediately preceding coarse pulse No. 3. Four operating sequences are shown in the chart, each corresponding to a different starting time for the input pulse, and the terminal states for the four sequences, along with the corresponding direct binary code and complementary binary code, are summarized in the small chart with rows numbered I through IV.

In the embodiment of FIG. 3 each flip-flop is arranged effectively to "latch-back" upon itself. That is, when the flip-flop is turned "on" the "on" signal is employed to control the gating for the next corresponding fine pulse to turn the flip-flop "off" and when the flip-flop is "off" the "off" signal is employed to control the gating of an "on"-turning fine pulse of corresponding number. In particular, this means that when flip-flop F1 is in the "on" state and a fine pulse occurs at fine time 1, flip-flop F1 is turned "off." Since, as an illustration, the embodiment of FIG. 3 is assumed to include four flip-flops and only fine pulses are generated, only four starting states are possible. These are illustrated in FIG. 3A as conditions I through IV. Under condition I it is assumed that the control signal is turned "on" just before the occurrence of coarse pulse number 1 represented by the horizontal line. This causes flip-flop F1 to be turned to a binary one state. Each successive fine pulse then is effective to turn on its corresponding flip-flop so that after four fine pulse intervals have passed all flip-flops F1 to F4 have been turned "on." Following coarse pulse number 2 then, assuming that the control signal still remains "on," each flip-flop F1 to F4 is turned "off," successively so that after eight fine pulse intervals flip-flops F1 through F4 are back in the starting state where they are all zeros.

Under condition II it is assumed that the control signal does not turn "on" until just after coarse pulse number 1 which means that the first fine pulse to be gated through is in position two so that flip-flop F2 is first turned "on" and then F3 and F4. The states of flip-flops F1 to F4 at the time just prior to the occurrence of coarse pulse number 3 then are binary 1 0 0 0. In condition III the control signal turns "on" just before fine pulse 3, and in condition IV the control signal turns "on" just before fine pulse 4, giving the terminal states shown on the bottom of columns III and IV prior to coarse pulse number 3. In this embodiment the counting cycle is not self limiting, since the flip-flops are not latched back to the preceding coincidence circuit, and therefore the control signal must be terminated by the third coarse pulse in each case to preserve the terminal state of the flip-flops. It will be noted that different states are present in flip-flops F1 through F4 just prior to coarse pulse number 2 in addition to the different states shown just prior to coarse pulse number 3. This means that either coarse pulse number 3 or coarse pulse number 2 may be employed to detect the states of flip-flops F1 through F4 in order to determine precisely the time of occurrence of the passage of the first fine pulse to a corresponding flip-flop. If the states of the flip-flops are determined prior to coarse pulse number 2, the control signal will be terminated by coarse pulse number 2 rather than coarse pulse number 3, as described above.

This same technique may, of course, be utilized to detect the state of flip-flops at any given fine pulse following the third fine pulse after coarse pulse number 1, since the flip-flop states are different for each succeeding fine pulse. In this case the sequence of states of flip-flops F1 through F4 may appear as under condition I and the gating of fine pulses may be terminated at such time as the selected terminating input pulse is received causing the control signal to turn "off." Thus if the pulse period is terminated three fine pulses following the occurrence of coarse pulse number 2, the states of flip-flops F1 to F4 would be: 0 0 0 1.

It may be noted that an eight-tap delay line may be employed with four flip-flops with fine pulses in positions 5 to 8 being employed to trigger flip-flop F1 through F4, respectively. In this manner four flip-flops are sufficient to represent eight quantizing intervals between coarse pulses. In this case a coarse pulse period corresponds to that between coarse pulses number 1 and number 3 shown in FIG. 3A.

Where only four flip-flop conditions are permitted the derivation is quite straightforward as indicated in FIG. 3A. A more complex derivation is indicated in Table I below where it is assumed that eight fine pulses occur between the coarse pulses and flip-flops F1 to F4 are cycled continuously until receipt of an input pulse which terminates cycling. The terminal state of the flip-flops for different timing of the input signal are shown in Table I, below, where the column of numbers on the left indicates the fine pulse number corresponding to the time of the input signal, and each row indicates the terminal register state for the corresponding input timing. The logical equations, below, show the logic for translating the terminal states into direct and complementary binary codes, and the 0 and 0′ columns on the right indicate the specific codes corresponding to specific terminal register states. The manner in which the defining logic for output signals $O_4$, $O_2$, and $O_1$ is derived should be apparent to those skilled in the art as well as the derivation of $\phi$ complementary logic for $O_4'$, $O_2'$, and $O_1'$.

TABLE I

| | F1 | F2 | F3 | F4 | $O_4$ | $O_2$ | $O_1$ | $O_4'$ | $O_2'$ | $O_1'$ |
|---|---|---|---|---|---|---|---|---|---|---|
| 1 | 0 | 0 | 0 | 0 | 0 | 0 | 0 | 0 | 0 | 0 |
| 2 | 1 | 0 | 0 | 0 | 0 | 0 | 1 | 1 | 1 | 1 |
| 3 | 1 | 1 | 0 | 0 | 0 | 1 | 0 | 1 | 1 | 0 |
| 4 | 1 | 1 | 1 | 0 | 0 | 1 | 1 | 1 | 0 | 1 |
| 5 | 1 | 1 | 1 | 1 | 1 | 0 | 0 | 1 | 0 | 0 |
| 6 | 0 | 1 | 1 | 1 | 1 | 0 | 1 | 0 | 1 | 1 |
| 7 | 0 | 0 | 1 | 1 | 1 | 1 | 0 | 0 | 1 | 0 |
| 8 | 0 | 0 | 0 | 1 | 1 | 1 | 1 | 0 | 0 | 1 |

*Direct Code Logic*

$O_4=F4$ $O_2=F2.F4'+F2'.F4$ $O_1=(F1+F4).F2'.F3'+(F1'+F4').F2.F3$

*Eight's Complement*

$O_4'=F1$ $O_2'=F1.F3'+F1'.F3$ $O_1'=O_1$

Figure 4:
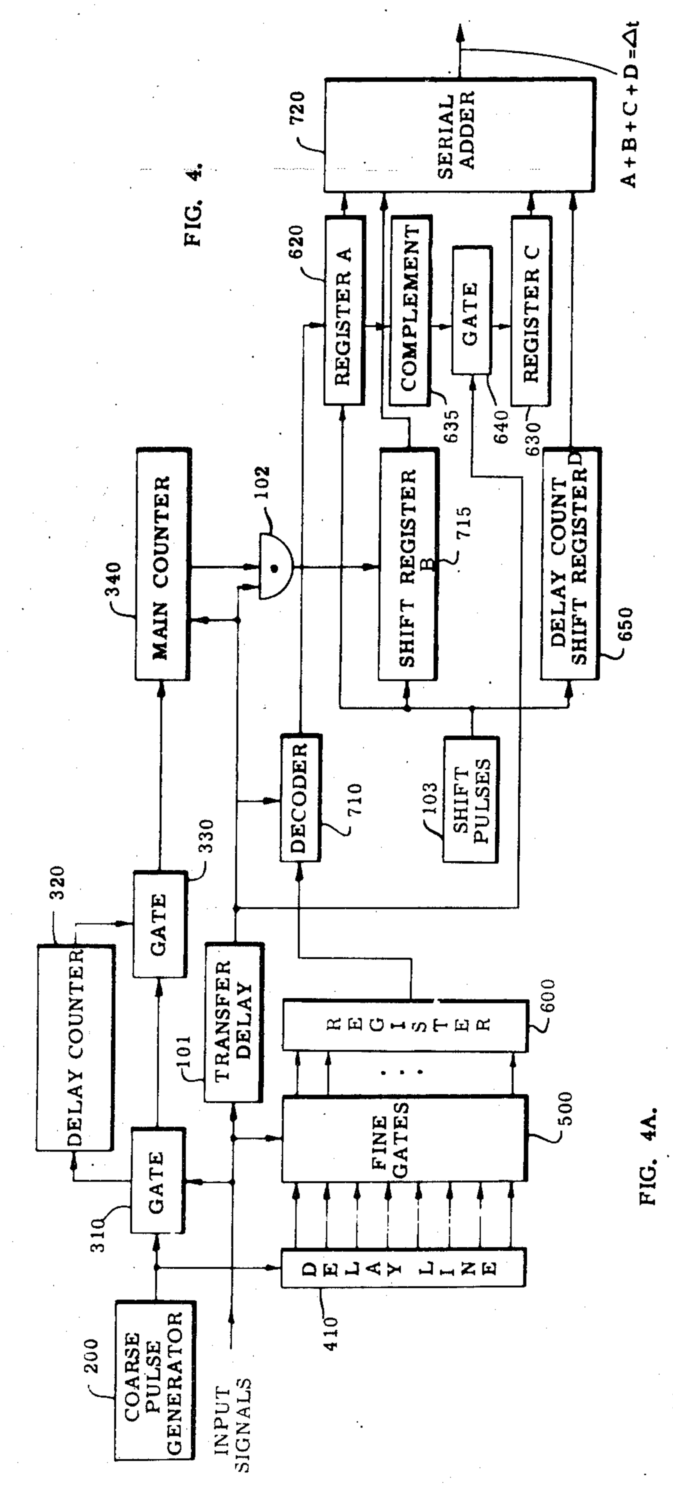
FIG. 4 is a block diagram of a system for continuously measuring intervals between successive input signals according to the invention.
Figure 4A:
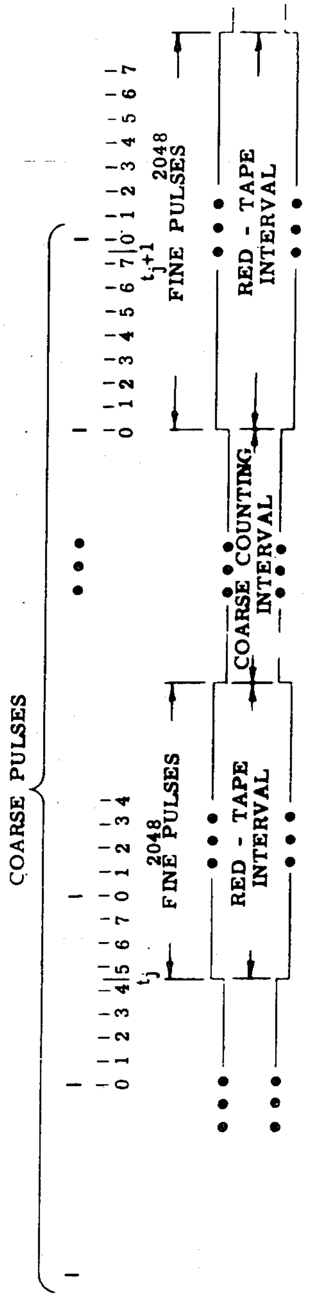
FIG. 4A is a composite set of wave forms illustrating the operation of the embodiment of FIG. 4.

Reference is now made to FIGS. 4 and 4A wherein a complete system is shown incorporating the basic circuits of the invention. In the embodiment of FIG. 4 provision is made to continuously represent the pulse intervals between successive input signals in accordance with the above described technique of adding the coarse time count to the direct and complementary fine time codes. It is necessary in such an arrangement to provide for a period of operation which may be referred to as the "red-tape" interval during which time a main counter 340 for counting the coarse pulses is allowed to rest and settle while the carrys therein are being cascaded. The "red tape" interval occurs during the time period when the main counter is reset to zero, i.e. the time period immediately following each input signal to the control circuit 100. During red tape interval, which is assumed in the illustration of FIG. 4A to have a duration of 2048 fine pulses, a delay counter 320 is operative receiving its input signals through a gate 310. Gate 310 is operated by the control signal, which in this embodiment is a voltage gate beginning with each input signal to the control circuit, and extending longer than the red tape interval in time. When the control signal is high, gate 310 routes coarse pulses to delay counter 320, which is pre-set to block the coarse pulses during the "red tape" interval, and then to pass the coarse pulses through gate 330 to the main counter after the "red tape" interval ends. Shortly after the "red tape" interval ends, the control signal drops, and coarse pulses are routed directly through gates 310 and 330 to the main counter. Thus delay counter 320 acts as a counting switch which is normally closed, but which opens after receiving 256 coarse pulses. The count of main counter 340 is therefore short by a constant factor of 256 in each interval measured, and this constant factor is added to each readout of counter 340 by a delay count register 650, later to be described. As in the embodiments described above the coarse pulses are also applied to a delay line 410 providing separate input signals for a plurality of fine gates 500. Fine gates 500 are preferably of the self limiting type disclosed in FIG. 2, which cycle through 7 changes of state regardless of control signal length.

The output signals derived through means 500 are applied to register 600 which is coupled to a decoder 710 forming part of combining circuit and output means 700. Decoder 710 is actuated by a suitable transfer delay device 101 to transfer its signal to a register "A" identified by the number 620. The delay of transfer device 101 must exceed the time required for register 600 to complete a full cycle and arrive at a terminal state. The terminal state of register 600 is translated, by the direct code logic of FIG. 2A, into a binary number which is then transferred to register A. In the case of the example of FIG. 4A this transfer is binary 1 0 0, representing the fact that the input pulse occurred at the time interval referred to as $t_j$ between fine pulses 4 and 5. The signal produced by delay 101 may also be employed to clear fine register 600, if desired. Register 600 can alternately be cleared by a set pulse generated after the code of decoder 710 has been transferred to register A.

After this transfer operation, the flip-flops of register 600 are reset and the count in main counter 340 is transferred through a gating circuit 102 forming part of control circuit 100 to a shift register "B" identified also by number 715, forming part of output means 700. Gating circuit 102 is opened by the output signal of transfer delay 101, and therefore the transfer of the coarse count to register B coincides in time with the transfer of the fine count to register A. Register 715 is actuated by shift pulses produced by device 103 which also forms part of control circuit 100 and shift pulses are also applied to a delay count shift register "D" identified also by number 650 which stores a signal representing the red-tape interval. This may be accomplished in a straight-forward manner by entering a binary one in the eleventh significant position on the register to represent 2048 fine pulses corresponding to the red-tape interval.

The next step in operation is to add the contents of registers A, B, C, and D (620, 715, 630, and 650) by means of a serial adder 720 which forms part of output means 700. The number in register "C" identified as 630 is the complement of the fine code previously entered into register "A" at time $t_{j-1}$. This occurs because in the continuous operation illustrated in FIG. 4A the end of each pulse interval also constitutes the beginning of the next interval and therefore any fine pulse measurement which is made constitutes not only the ending interval for the previous period but the beginning interval for the next. It is the measurement at the end of an interval which is translated as a direct code and entered into register "A" (620) and this then is complemented through a device 635 and passed through a gate 640 under the control of transfer delay 101, to register "C" (630) at the end of the operation. Since a time lag is involved in translating the direct code of register A into the complementary code in means 635, the complementary code passed through gate 640 to register C is the complementary code of the previous input pulse. Thus immediately following the output signal of transfer delay 101, register A contains the direct fine code of the present input signal, register C contains the complementary fine code of the previous input signal, register B contains the coarse count between the two input signals minus the "red tape" interval, and register D contains the count of the "red tape" interval. As described above, the sum of these counts gives the time interval between the two input signals to the nearest increment of fine time.

Thus serial adder 720 produces an output signal which combines registers A, B, C, and D to form a digital representation of $\Delta t$ constituting the high-resolution time difference measured between pulses occurring at times $t_{j-1}$ and $t_j$, in the present example.

After the addition is completed to provide the desired output signal delay counter 320 is cleared for the next operation and coarse pulses are then routed to main counter 340. In addition the eights complement of "A" register 620 is transferred to "C" register 630.

From the foregoing description it should now be apparent that the present invention provides an improved technique for accomplishing high-resolution quantizing without the necessity of complex vernier or pulse-delay techniques.

Several illustrations of the basic technique of the invention have been given. In particular it has been shown that the "latch-back" technique of the invention may be employed where a series of flip-flops are actuated sequentially by respective fine pulses, each flip-flop providing a control signal for the adjacent flip-flop to prevent it from changing state in response to fine pulses following the occurrence of an input signal.

It has also been demonstrated that the invention may be practiced without the "latch-back" technique by triggering each flip-flop by respective fine pulses. This latter method of operation has been discussed in two general procedures, one where four flip-flops are actuated by four respective fine pulses and another where four flip-flops may be actuated by eight fine pulses to subdivide a coarse pulse interval by eight.

Particular circuits for providing the fine gates of flip-flops according to the invention have not been described since they are well known in the computing art. It will be understood, therefore, that the basic features of the invention do not depend upon any particular type of circuit element or combination thereof but rather reside in the overall concept of fine pulse gating as described above, and as defined in the appended claims.

I claim:

1. A quantizer for producing output signals representing the precise time of occurrence of an input signal which occurs between first and second pulses designating the time boundaries of a relatively large time interval, the time that said input signal precedes said second pulse being designated by a number of fine timing signals which are produced to provide a predetermined number of subdivisions for each of said relatively large time intervals, said quantizer comprising: a control circuit for receiving said input signal and producing a control signal which is "off" prior to receipt of said input signal and is "on" for a predetermined period following receipt of said input signal; a plurality of storage elements corresponding in number to the number of subdivisions in said relatively large time interval; means responsive to said control signal and to said fine timing signals for applying each of said fine timing signals to a respective storage element to provide a unique representation of the time of occurrence of the particular fine timing signal with reference to the preceding input signal; means for terminating the operation of said last-named means to establish a final set of states for said storage elements, each final set of states uniquely designating the time of occurrence of the input signal in terms of the particular fine timing signal which was first applied to a respective storage element under the control of said control signal; and means for producing said output signals to represent the number of fine time intervals between said input signal and said second pulse.

2. A quantizing circuit for producing an output signal set specifying the precise lapse of time between first and second input signals, the lapse of time being measured in terms of a number of coarse pulses designating relatively large unit time intervals, and in terms of the sum of a first number of fine pulses designating relatively small unit time intervals between the first input signal and the following coarse pulse and a second number of fine pulses designating the relatively small unit time intervals between the second input signal and the preceding coarse pulse, said quantizing circuit comprising: a plurality of bistable devices, one for each of the fine pulses produced during each relatively large unit interval; a plurality of gating circuits, one for each of said bistable devices, for receiving respective ones of said fine pulses; gate control means responsive to said input signals for causing said fine pulses to pass to respective bistable devices; means for terminating the passing of fine pulses to said bistable devices firstly after said first number of fine pulses, and secondly after said second number of fine pulses have been applied to said bistable devices; and means coupled to said bistable devices for translating the states thereof to form said sum of fine pulses to be combined with the number of said coarse pulses to designate said lapse of time.

3. A time interval measuring device for providing an electrical representation of the precise time interval between first and second input pulses, said representation being specified in terms of a number of coarse pulses having a period of relatively large duration and a number of fine pulses having a period substantially shorter than said relatively large period, there being an integral number of fine pulses during each coarse pulse period, said device comprising: a storage register having a number of digital positions corresponding to the number of fine pulses in each coarse pulse period; gating means, responsive to said input signals, for applying said fine pulses to respective digital positions of said storage register to set said register to a total state representing the precise time of application of the first fine pulse to a respective digital position; and means for combining the complementary digital representation of the total state of said register after said first input pulse is applied with the direct digital representation of the total state of said register after said second input pulse is applied to constitute a total fine pulse count to be added to said coarse count to provide said electrical representation.

4. An arrangement for providing a precise representation of the number of relatively small intervals which occur between a coarse pulse designating a terminal point of a relatively large unit time interval and the occurrence of an input pulse, said arrangement comprising: first means for deriving a series of fine pulses corresponding to the desired resolution for translating said relatively large intervals into relatively small intervals; a plurality of electronic gates for receiving said fine pulses, respectively, and for receiving a control signal having an "on" representing state for a predetermined period following the receipt of said input pulse; a plurality of flip-flops coupled to said plurality of electronic gates, respectively, each flip-flop being set to a predetermined state in accordance with the signal derived through the associated electronic gate; and means for translating the final states of said flip-flops to an output signal set representing the fine time interval between said coarse pulse and said input pulse.

5. In a precise time measuring system including coarse and fine pulse generators, the fine pulses being produced to bear a predetermined fixed relationship to the coarse pulses, the combination comprising: a plurality of fine gating elements corresponding in number to the number of fine pulses generated during each coarse pulse interval; a corresponding plurality of flip-flops, one coupled to each fine gating element, for registering a respective one of said fine pulses passed through the associated gating element; a control circuit for actuating said fine gating elements to start to pass respective fine pulses to the associated flip-flop after receipt of an input signal; means including a latch-back circuit coupling each flip-flop to one other for causing said flip-flops to assume a total set of states uniquely designating the precise time of occurrence of the first fine pulse to pass to its respective flip-flop; and means for translating the total set of states of said flip-flops and a count of said coarse pulses to an output signal set representing the precise time of occurrence of said input signal.

6. In combination: first means responsive to first and second input signals for counting the interval between said input signals in terms of pulses having a relatively low frequency rate; second means for multiplying the frequency rate of said first pulses to provide second pulses having a relatively high frequency rate; a storage register having a series of stages, one stage for receiving a respective one of each of the second pulses occurring during each first pulse interval; third means for setting the stages of said register upon receipt of said first input signal to represent the number of fine pulses which occur between the first input signal and the following first pulse; fourth means for setting the stages of said register upon receipt of said second input signal to represent the number of fine pulses which occur between said second input signal and the preceding first pulse; and fourth means for combining the representations of said storage register and the count of said first pulses to produce output signals representing the interval between said input signal.

7. A system for continuously measuring the intervals between successive pairs of input pulses, the first pulse in each pair constituting the second pulse of the previous pair, each interval being measured in terms of a number of coarse pulse intervals representing relatively large time units, and a number of fine pulse intervals representing relatively small time units, each coarse pulse interval being subdivided into a predetermined number of fine pulse intervals, said system comprising: first means for counting the number of coarse pulse intervals within each input pulse pair; a plurality of storage elements, one for each fine pulse interval within a coarse pulse interval; first gating and control means for setting said storage elements in response to the first input pulse in each pair by applying the first fine pulse occurring after receipt of the first input pulse to a corresponding one of said storage elements, and successive fine pulses to successively different storage elements, the final representation of the states of said storage elements after a number of fine pulses equal to the coarse pulse interval representing the precise time of occurrence of said first input pulse in terms of said coarse pulses and said fine pulses; second gating and control means for setting said storage elements in response to the second input pulse in each pair by applying the first fine pulse occurring after receipt of said second input pulse to a corresponding one of said storage elements, and successive fine pulses to successively different storage elements, the final representation of the states of said storage elements after a number of fine pulses then representing the precise time of occurrence of said second input pulse in terms of said coarse pulses and said fine pulses; and means for controlling the operation of said first and second gating and control means for combining the complementary representation of the setting of said storage elements for the first input pulse of a pair with the direct representation of the setting of said storage elements for the second input pulse of a pair to constitute the total fine pulse addition to the coarse pulse count to constitute the total precise measurement.

References Cited in the file of this patent

UNITED STATES PATENTS

| | | |
|---|---|---|
| 2,665,411 | Frady | Jan. 5, 1954 |
| 2,896,160 | Kronacher | July 21, 1959 |